United States Patent
Frazzini et al.

(10) Patent No.: US 9,432,438 B2
(45) Date of Patent: *Aug. 30, 2016

(54) DATA LOCKER SYNCHRONIZATION

(71) Applicant: Amazon Technologies, Inc., Seattle, WA (US)

(72) Inventors: Michael Anthony Frazzini, Seattle, WA (US); Ethan Zane Evans, Snoqualmie, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/743,084

(22) Filed: Jun. 18, 2015

(65) Prior Publication Data
US 2015/0295989 A1 Oct. 15, 2015

Related U.S. Application Data

(63) Continuation of application No. 14/193,704, filed on Feb. 28, 2014, now Pat. No. 9,061,202, which is a continuation of application No. 13/172,052, filed on Jun. 29, 2011, now Pat. No. 8,663,018.

(51) Int. Cl.
| | |
|---|---|
| A63F 9/24 | (2006.01) |
| A63F 13/00 | (2014.01) |
| G06F 17/00 | (2006.01) |
| G06F 19/00 | (2011.01) |
| H04L 29/08 | (2006.01) |
| H04L 29/06 | (2006.01) |

(52) U.S. Cl.
CPC ............ *H04L 67/02* (2013.01); *A63F 9/24* (2013.01); *H04L 67/1085* (2013.01); *H04L 67/1095* (2013.01); *H04L 67/142* (2013.01); *H04L 67/38* (2013.01); *A63F 2300/554* (2013.01)

(58) Field of Classification Search
USPC .............................. 463/9, 12, 20, 25, 42, 43
See application file for complete search history.

(56) References Cited

U.S. PATENT DOCUMENTS

| | | |
|---|---|---|
| 8,663,018 B2 | 3/2014 | Frazzini et al. |
| 2010/0115334 A1 | 5/2010 | Malleck et al. |
| 2011/0022812 A1 | 1/2011 | van der Linden et al. |
| 2011/0083098 A1 | 4/2011 | Cisler et al. |
| 2013/0005487 A1 | 1/2013 | Frazzini et al. |

FOREIGN PATENT DOCUMENTS

| | | |
|---|---|---|
| JP | 2006-093851 | 9/2004 |
| JP | 2007-244503 | 3/2006 |
| JP | 2007-516513 | 6/2007 |

(Continued)

OTHER PUBLICATIONS

Japanese Office Action for 2014-519004 mailed Jan. 27, 2015.

(Continued)

*Primary Examiner* — Adetokunbo O Torimiro
(74) *Attorney, Agent, or Firm* — Thomas | Horstemeyer, LLP

(57) ABSTRACT

Disclosed are various embodiments enabling a saved state of an application to be stored at a central location and to be retrieved by multiple computing devices executing the application. Accordingly, saved states of applications and interfaces are also enabled to follow a user from one personal computing device to the next.

20 Claims, 15 Drawing Sheets

(56) References Cited

FOREIGN PATENT DOCUMENTS

JP  2010-124349  6/2010
WO  2010050966  5/2010

OTHER PUBLICATIONS

English translation of the Abstract for JP 2006-093851 filed Sep. 21, 2004.
English translation of the Abstract for JP 2007-244503 filed Mar. 14, 2006.
English translation of the Abstract for JP 2010-124349 filed Nov. 21, 2008.
English translation of the Abstract for JP 2007-516513 filed Jun. 21, 2007.
International Search Report and Written Opinion, dated Sep. 6, 2012 for PCT/US 12/44586.
Chinese Office Action for 2012-80042500.0 mailed Dec. 24, 2015.
English translation of Chinese Office Action for 2012-80042500.0 mailed Dec. 24, 2015.
Canadian Office Action for 2,838,691 mailed on Apr. 18, 2016.

DATA LOCKER SYNCHRONIZATION

CROSS-REFERENCE TO RELATED APPLICATION

This application is a continuation of copending U.S. utility application entitled, "Data Locker Synchronization," having Ser. No. 14/193,704, filed Feb. 28, 2014, which is a continuation of U.S. utility application entitled, "Data Locker Synchronization," having Ser. No. 13/172,052, filed Jun. 29, 2011, issued as U.S. Pat. No. 8,663,018, which are entirely incorporated herein by reference.

BACKGROUND

There are many specialized forms of personal computing devices such as, for example, smartphones, electronic book readers, tablet computers, music players, and so on. Personal computing devices are often designed to be used by the owner of the device and are not designed to be passed around between or accessed by multiple users.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

The present disclosure relates to enabling a library of applications and/or data associated with a user and a personal computing device to follow the user from one personal computing device to the next over a network. Further, saved states of applications and interfaces are also enabled to follow the user from one personal computing device to the next.

For example, a user may purchase applications for a computing device, and the purchased applications may become part of an entitlement locker of applications to which the user is entitled. Also, data or media utilized by the user and/or the user's applications may be considered part of the user's entitlement locker. Further, the user may add to his or her entitlement locker by uploading data and/or applications (that the user is entitled to use) to a network site where the entitlement locker resides. As such, various embodiments of the present disclosure enable users to identify themselves to a computing device and then be provided network access to the entitlement locker of applications and/or data to which the user is entitled. In the following discussion, a general description of the system and its components is provided, followed by a discussion of the operation of the same.

Figure 1:
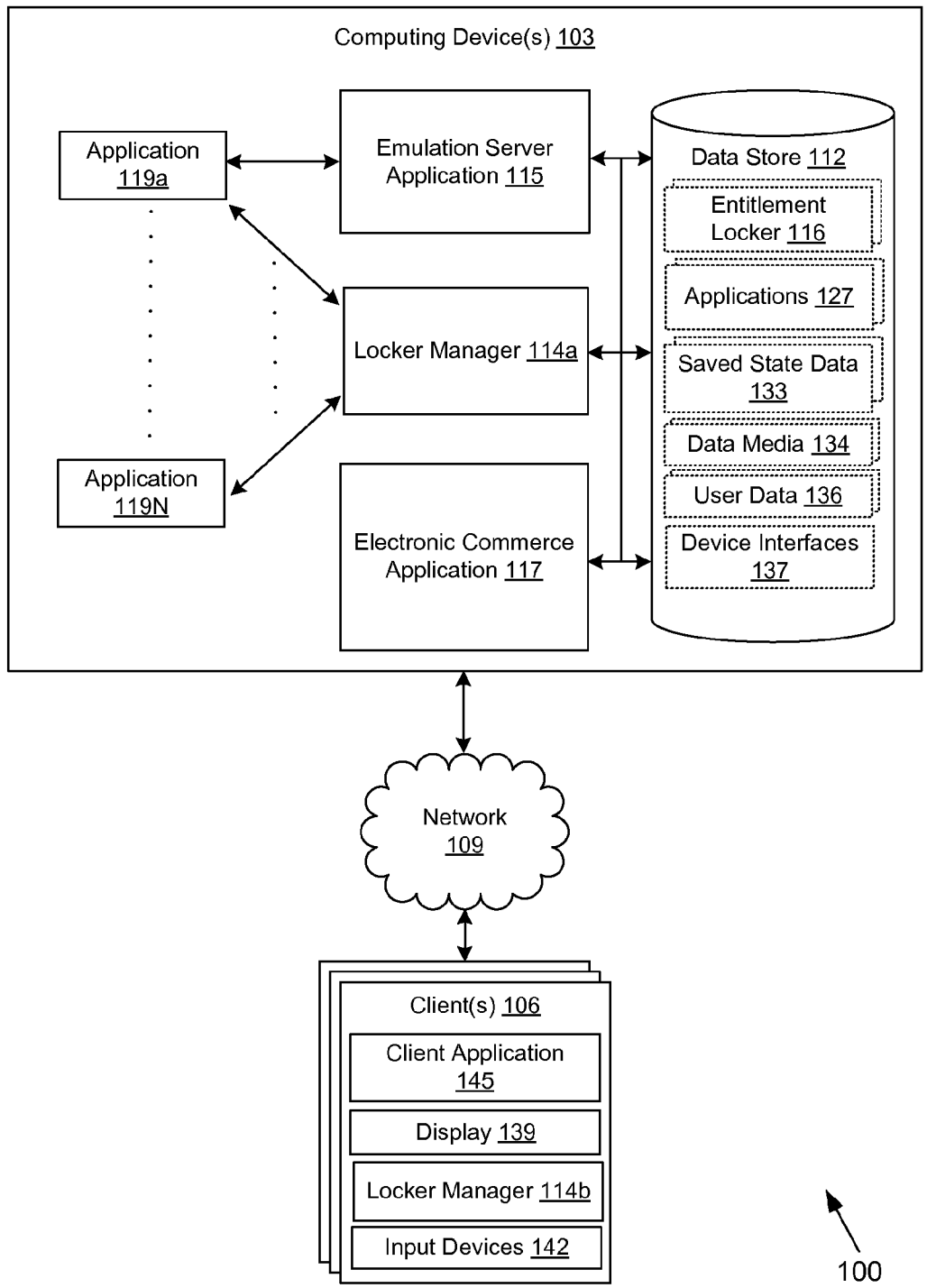
FIG. 1 is a drawing of a networked environment according to various embodiments of the present disclosure.

With reference to FIG. 1, shown is a networked environment 100 according to various embodiments. The networked environment 100 includes one or more computing devices 103 in data communication with one or more clients 106 by way of a network 109. The network 109 includes, for example, the Internet, intranets, extranets, wide area networks (WANs), local area networks (LANs), wired networks, wireless networks, or other suitable networks, etc., or any combination of two or more such networks.

The computing device 103 may comprise, for example, a server computer or any other system providing computing capability. Alternatively, a plurality of computing devices 103 may be employed that are arranged, for example, in one or more server banks or computer banks or other arrangements. For example, a plurality of computing devices 103 together may comprise a cloud computing resource, a grid computing resource, and/or any other distributed computing arrangement. Such computing devices 103 may be located in a single installation or may be distributed among many different geographical locations. For purposes of convenience, the computing device 103 is referred to herein in the singular. Even though the computing device 103 is referred to in the singular, it is understood that a plurality of computing devices 103 may be employed in the various arrangements as described above.

Various applications and/or other functionality may be executed in the computing device 103 according to various embodiments. Also, various data is stored in a data store 112 that is accessible to the computing device 103. The data store 112 may be representative of a plurality of data stores 112 as can be appreciated. The data stored in the data store 112, for example, is associated with the operation of the various applications and/or functional entities described below.

The components executed on the computing device 103, for example, include a locker manager application 114a, emulation server application 115, an electronic commerce application 117, a plurality of applications 119a . . . 119N, and other applications, services, processes, systems, engines, or functionality not discussed in detail herein. The emulation server application 115 may correspond to a type of application session server. The emulation server application 115 is executed to launch applications 119, which are executed within a virtualized environment for the application 119, in a scenario where applications 119 are accessed using a network browser of a client computing device 106. In other scenarios, application 119 may be downloaded to a client computing device 106 and installed and then executed by the client computing device 106. Similarly, locker manager application 114b may be downloaded to the client computing device 106 and installed and then executed by the client computing device 106.

Accordingly, versions of the locker manager application 114 may be executed by the computing device 103 or the client computing device 106. Therefore, locker manager application may be denoted as "locker manager application 114a" when executed by the computing device 103 and denoted as "locker manager application 114b" when executed by the client computing device 106.

The locker manager application 114 is executed to allow a user to access applications 119 and/or data that is entitled to be accessed by the user. In various embodiments, a user who purchases an application for a current client computing device 106 retains an entitlement to the application even if the user replaces a current client computing device 106 and/or purchases a new client computing device 106. Further, in some embodiments, it is mandated that a user has to sign-in or log into the locker manager application 114 to access one of the applications 119. When the application 119 is accessed by the user, the locker manager application 114 verifies whether the user has an entitlement to the application 119. If the user does not sign in or does not have an entitlement to the application 119, then the application 119 will not be usable. However, a user can gain entitlement by purchasing the application 119, such as by purchasing through the electronic commerce system 117. Likewise, a user may lose entitlement to an application or other resource after a term of use or a rental or license period for the applicable application, resource, etc. expires. Accordingly, entitlement to a particular resource may have a limited duration. For example, a user's subscription to an electronic book or periodical or a network movie service may eventually lapse.

Further, in some embodiments, the locker manager application 114 allows for a first user to sign in as a user of a first application 119 on a computing device 106 and a second user to sign in as a current user of a second application 119 on the computing device 106. Accordingly, the computing device 106 may multitask and execute one application from the first user's entitlement locker 116 and execute another application from the second user's entitlement locker 116.

Also, in some embodiments, during the installation of an application 119 on a client computing device 106, the device 106 may download a token from the electronic commerce system 117 that grants the purchasing user the right to access the application 119 for a defined period. Accordingly, a valid token may permit the user that purchased the application 119 to access the application offline during this defined period. Therefore, the locker manager 114 may periodically communicate with computing device(s) 103 to refresh the token and establish a new period of use.

The locker manager application 114 is also executed to transmit and retrieve saved state data 133 to the data store 112 for a particular user. Accordingly, the locker manager application 114 allows for a user to provide login credentials, whereby the login credentials are used to associate the user with applications and/or data to which the user is entitled. The locker manager application 114 may communicate with the data store 112 to obtain pertinent information such as application and data information associated with the user over various protocols such as, for example, hypertext transfer protocol (HTTP), simple object access protocol (SOAP), representational state transfer (REST), real-time transport protocol (RTP), real time streaming protocol (RTSP), real time messaging protocol (RTMP), user datagram protocol (UDP), transmission control protocol (TCP), and/or other protocols for communicating data over the network 109. The locker manager application 114 is configured to maintain state information 133 and entitlement lockers 116 for respective users that may share a client computing device 106.

The electronic commerce application 117 is executed in order to facilitate the online purchase of items, such as downloaded applications, from a merchant over the network 109. The electronic commerce application 117 also performs various backend functions associated with the online presence of a merchant in order to facilitate the online purchase of items. For example, the electronic commerce application 117 may generate network pages or portions thereof that are provided to clients 106 for the purposes of selecting items for purchase, rental, download, lease, or other forms of consumption. In some embodiments, the electronic commerce application 117 is associated with a network site that includes an electronic marketplace in which multiple merchants participate.

The application 119 may correspond, for example, to a game or other types of applications. As non-limiting examples, the application 119 may correspond to a first-person shooter game, an action game, an adventure game, a party game, a role-playing game, a simulation game, a strategy game, a vehicle simulation game, and/or other types of games. The application 119 may be originally designed for execution in a general-purpose computing device or in a specialized device such as, for example, a smartphone, a tablet, a video game console, a handheld game device, an arcade game device, etc. The applications 119 may also correspond to mobile phone applications, computer-aided design (CAD) applications, computer-aided manufacturing (CAM) applications, photo manipulation applications, video editing applications, office productivity applications, operating systems and associated applications, emulators for operating systems, architectures, and capabilities not present on a consumer device, and other applications and combinations of applications. An emulator system, for example, might include software and/or hardware components that emulate or simulate some or all of hardware and/or software components of the system for which the application software was written. For example, the emulator system could comprise a personal computing device such as a tablet computer or smartphone, which executes a software emulator program that simulates the hardware and/or firmware of the system. The emulator could also comprise a general-purpose computer that simulates the hardware and/or firmware of the system.

The application 119 may expect to access one or more resources of the device on which it is executed. Such resources may correspond to display devices, input devices, or other devices. In some cases, the application 119 may request exclusive access to one or more of the resources, whereby no other applications may have access to the particular resources.

The data stored in the data store 112 includes, for example, applications 127, saved state data 133, user data 136, entitlement data 134, device interfaces 137, and potentially other data. The data store 112 includes entitlement lockers 116 for a plurality of users, where an entitlement locker 116 maintains data personal to the user, including the aforementioned saved state data 133, user data 136, entitlement data 134, etc. that can be transferred to whatever computing device 106 the user is accessing. Entitlement data 134 can include, but is not limited to including, music files, picture files, video files, electronic books, saved emails, video games and video game downloadable content (e.g., specific extensions, entitlement rights, unlock keys, or other rights to virtual items or sub elements within a video game, etc.), document files, etc. The entitlement locker 116 includes identifications of applications 119 that have been purchased, applications 127 that have been transferred to the data store 112 by the user, entitlement data 134 that has been transferred to the data store 112 by the user, entitlement data 134 that has been transferred from an application 119 contained on the entitlement list, services that the user currently has license to use, etc. A particular piece of entitlement data 134 may also depend upon or extend from another piece of entitlement data. For example, a user may purchase 1000 units of an in-game currency or buy the rights to a new level within a game. This new level or currency is a piece of entitlement data 134 that depends on the user's entitlement locker 116 including the entitlement data of the game itself in order to be utilized. Such entitlements may also apply to other media as well. For instance, entitlement data 134 may correspond to editing rights to a book (e.g., can a user copy the text or is the text locked), alternate endings, directors commentary tracks to a movie, etc.

The applications 127 correspond to a library of different applications that are available to be launched as applications 119. The applications 127 may correspond to executable code within the computing device 103. Alternatively, the applications 127 may correspond to code that is executable within another type of device (e.g., client computing device 106) but is not executable within the computing device 103.

The saved state data 133 corresponds to application states, such as application states (e.g., game states) or settings that have been saved by the applications 119. The saved state data 133 may also include bookmarks or place holders within an application as to where the user left the application, customizable application settings, etc. A user may have different or individual versions of saved state data 133 for each of his or her applications. Further, a particular computing device may have a saved state data file 133 saving an arrangement of a desktop or other settings pertinent to the device. Because the applications 119 may be executed in a virtualized environment, the applications 119 may write state information to a virtual location, which is then mapped for storage in the data store 112 as the saved state data 133. In various embodiments, the saved state data 133 may correspond to data saved normally by the application 119 or may correspond to a memory image of the application 119 that may be resumed at any time. Also, in some embodiments, the saved state data 133 may correspond to a complete state of the computing device 106 itself. For example, a state of a first computing device 106 may be saved to the data store 112 (e.g., upon undergoing hibernation before powering down), which will allow another computing device 106 to be brought up in the exact saved state of the first computing device 106.

The user data 136 includes various data related to the users of the applications 119, such as, for example, types of computing devices associated with a user, security credentials, application preferences, billing information, a listing of other users that are permitted to access resources listed in a respective user's entitlement locker 116, and so on.

The device interfaces 137 correspond to images, animations, code, hypertext markup language (HTML), extensible markup language (XML), cascading style sheets (CSS), and/or other data that may be used to generate a graphical representation of a virtualized computing device. It is noted that an application 119 that is executable on a particular computing device platform may be associated with a multitude of device interfaces 137. As a non-limiting example, the Android® platform for smartphones may be supported by a multitude of different models of smartphones. Some of the models may have mini-keyboards with a touchscreen, while others may have merely a touchscreen with no physical mini-keyboard. The models may have different controls and casings. Therefore, different device interfaces 137 may be provided for different models of Android® smartphones.

The client 106 is representative of a plurality of client devices that may be coupled to the network 109. The client 106 may comprise, for example, a processor-based system such as a computer system. Such a computer system may be embodied in the form of a desktop computer, a laptop computer, personal digital assistants, cellular telephones, smartphones, set-top boxes, televisions that execute applications and can access the network 109, music players, web pads, tablet computer systems, game consoles, electronic book readers, or other devices with like capability.

The client 106 may include a display 139. The display 139 may comprise, for example, one or more devices such as cathode ray tubes (CRTs), liquid crystal display (LCD) screens, gas plasma-based flat panel displays, LCD projectors, or other types of display devices, etc. The client 106 may include one or more input devices 142. The input devices 142 may comprise, for example, devices such as keyboards, mice, joysticks, accelerometers, light guns, game controllers, touch pads, touch sticks, push buttons, optical sensors, microphones, webcams, and/or any other devices that can provide user input. Additionally, various input devices 142 may incorporate haptic technologies in order to provide feedback to the user.

The client 106 may be configured to execute various applications such as a client application 145 and/or other applications. In various embodiments, the client application 145 corresponds to a network browser application. The client application 145 is executed, in some embodiments, to allow a user to launch, join, play, or otherwise interact with an application 119 executed in the computing device 103. To this end, the client application 145 is configured to capture input commands provided by the user through one or more of the input devices 142 and send this input over the network 109 to the computing device 103.

The client application 145 is also configured to obtain application output data over the network 109 from the computing device 103 and render a screen on the display 139. To this end, the client application 145 may include one or more video and audio players to play out a media stream generated by an application 119. In one embodiment, the client application 145 comprises a plug-in or other client-side code executed within a network browser application. The client 106 may be configured to execute applications beyond the client application 145 such as, for example, browser applications, email applications, instant message applications, and/or other applications.

Figure 2:
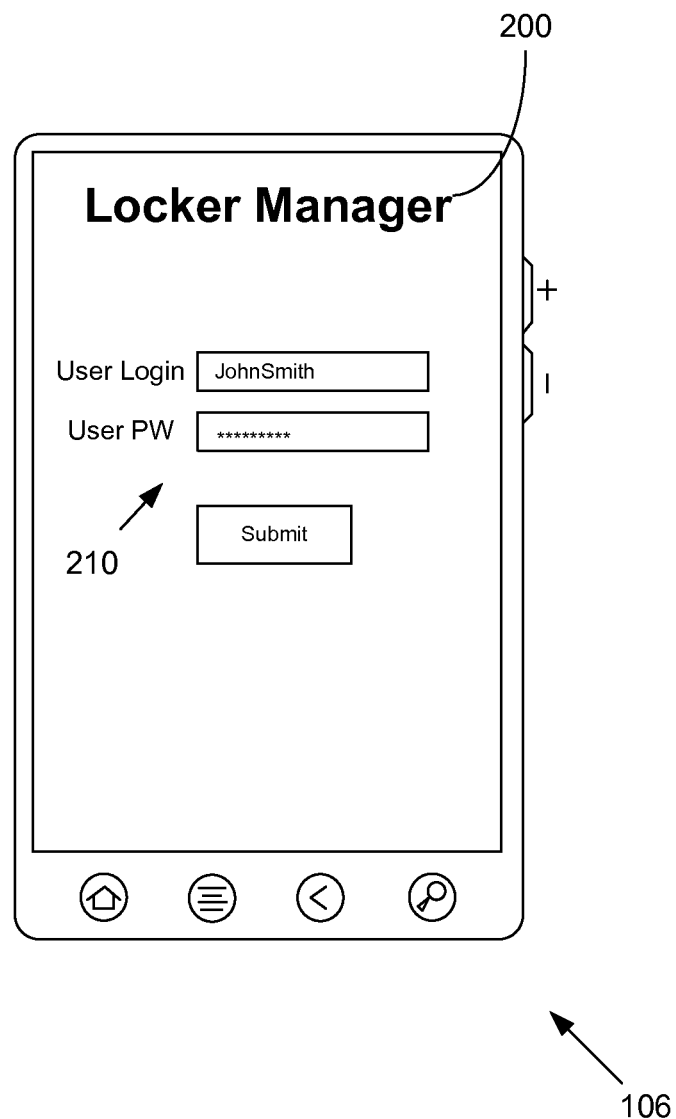
FIGS. 2-5 and 7-9 are drawings of user interfaces executed in a client in the networked environment of FIG. 1 according to various embodiments of the present disclosure.

Turning now to FIG. 2, shown is one example of a user interface 200 rendered by the locker manager application 114 (FIG. 1) executed in a client 106 in the networked environment 100 (FIG. 1). The user interface 200 shown in FIG. 2 corresponds to a login interface or screen 210 whereby a user of the client 106 may identify himself or herself as the current user of the client device 106. After the user logins and identifies himself/herself, the locker manager application 114b allows for the user to access applications and/or data to which the user is entitled and to which another user of the client device 106, such as the owner, may not be entitled. It is noted that many client devices are associated with single users or owners. For example, a mobile phone is tied to a single phone number for a single account holder. Also, many personal client devices, such as mp3 music players, are registered to or authorized for use with a music account of a single individual or owner (e.g., an account for purchasing music from an online store).

Accordingly, the login screen 210 allows for multiple users and multiple saved states for a single application to be used with a single client computing device 106, such as a personal computing device. Accordingly, in one embodiment, a user may log in or sign in with credentials (e.g., username and password) accepted by the locker manager application 114. While logged in, access to applications and data is allowed by the locker manager application 114 for those applications/data identified and recorded within the user's entitlement locker 116 (FIG. 1) at the data store 112 (FIG. 1). Correspondingly, in one embodiment, the entitlement locker 116 for a particular user contains a record of the applications and data to which the particular user is entitled to use.

To log off of the locker manager 114 and discontinue an active session, the user may logout manually. Alternatively, inactivity on a client computing device 106 may be detected causing the current user to be logged off the locker manager application 114. For example, the locker manager application 114 may be configured to logout a user after 15 minutes (or other designated period) of inactivity, where detection of a touch input on a touchscreen or keyboard of the client computing device 106 resets a timer that is tracking a period of inactivity.

Figure 3:
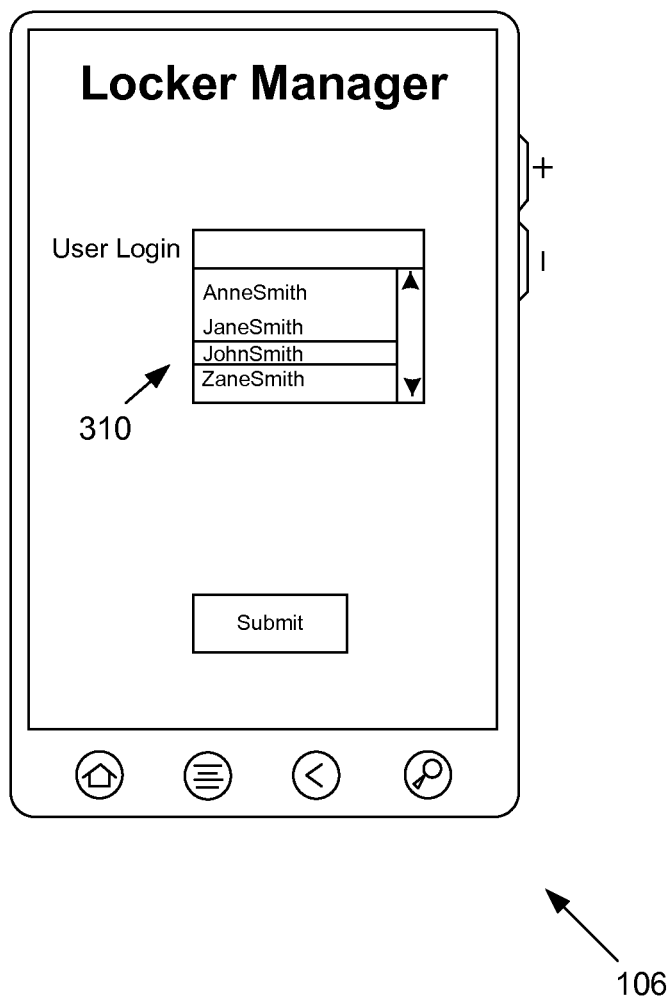

Referring next to FIG. 3 in various embodiments, a login list 310 may be provided from the application manager application 114 (FIG. 1). The login list 310 may display a plurality of users of a particular client device 106, where a current user may select his or her username from the list 310. Further, the computing client device 106 may maintain locally a password that is associated with each of the displayed usernames. This allows for a user to select his or her username from the list causing the client device 106 to retrieve the saved password associated with the selected login and to provide the credentials to the computing device 103 (FIG. 1). In the example shown, the user selects the username corresponding to "JohnSmith." Accordingly, after selection of the username, JohnSmith is then logged into the locker manager application 114.

It may be that the login list 310 contains usernames for a primary account holder and sub-account holders named by the primary account holder, where the primary account holder is the administrator for the application manager application 114 for a particular client computing device 106. Under this scenario, the administrator may associate one or more other accounts as sub-accounts to his or her primary account. As a result, the holders of the sub-accounts are entitled to use applications from the entitlement locker 116 (FIG. 1) of the primary account holder.

In addition to maintaining a list of applications to which the current user is entitled, embodiments of the locker manager application 114 also maintain saved state data 133 (FIG. 1) for the applications 119 (FIG. 1) utilized by the current user and data modified by the user during a session of activity on the client computing device 106. In the scenario described above, where a primary account is associated with sub-accounts, saved state data 133 for each of the applications is compiled separately and also individually saved to each sub-account in addition to the primary account. Therefore, when a particular sub-account holder logs into the locker manager application 114 of the client device 106, his or her past saved state data is downloaded to an application 119 being launched as opposed to the saved state data of the primary account holder or another sub-account holder.

Figure 4:
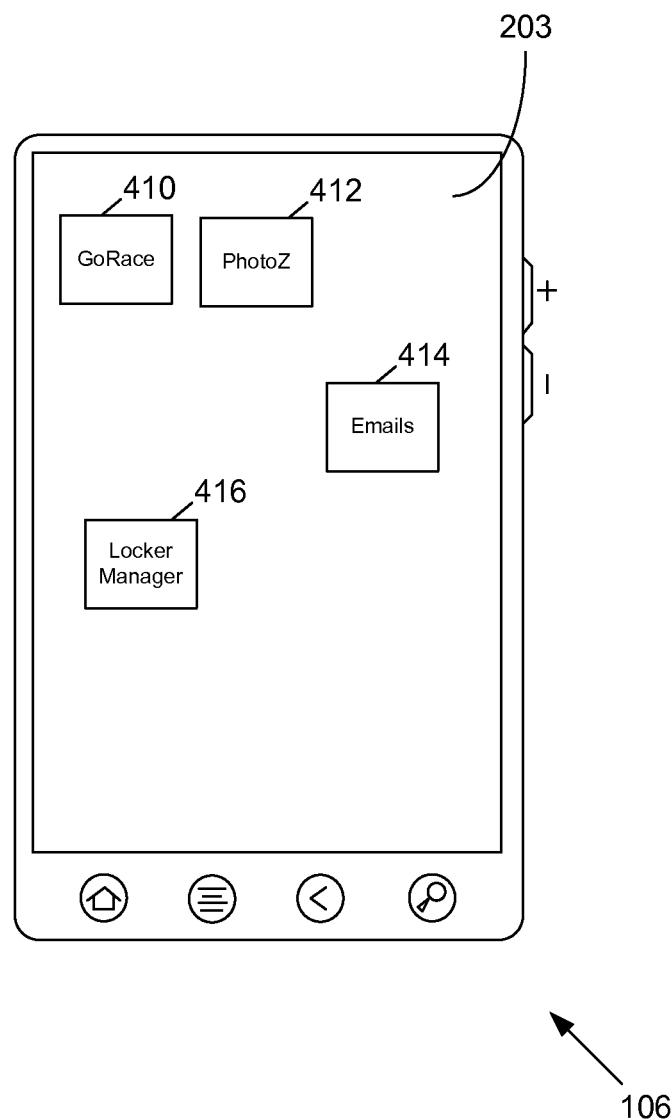

In an example, consider that an owner ("Owner") of a smartphone may have previously purchased three applications for his phone which are recorded as part of his entitlement locker 116. Also, consider that these three applications may have also been installed on the phone. Referring to FIG. 4, a diagram of a smartphone belonging to the Owner is shown, where three applications are resident on the phone: a "GoRace" game, a "PhotoZ" application, and an "Emails" program (as indicated by respective desktop icons 410, 412, 414), in addition to the locker manager application 114 (as indicated by desktop icon 416).

Accordingly, when the Owner is logged into the locker manager application 114 (FIG. 1) and is recognized as the current user of the smartphone, the locker manager application 114 does not restrict the Owner's access to the three applications. However, the locker manager application 114 does restrict another user from using or launching these applications when the other user is not logged in and/or does not include the three applications as part of his or her entitlement locker 116 (FIG. 1).

Figure 5:
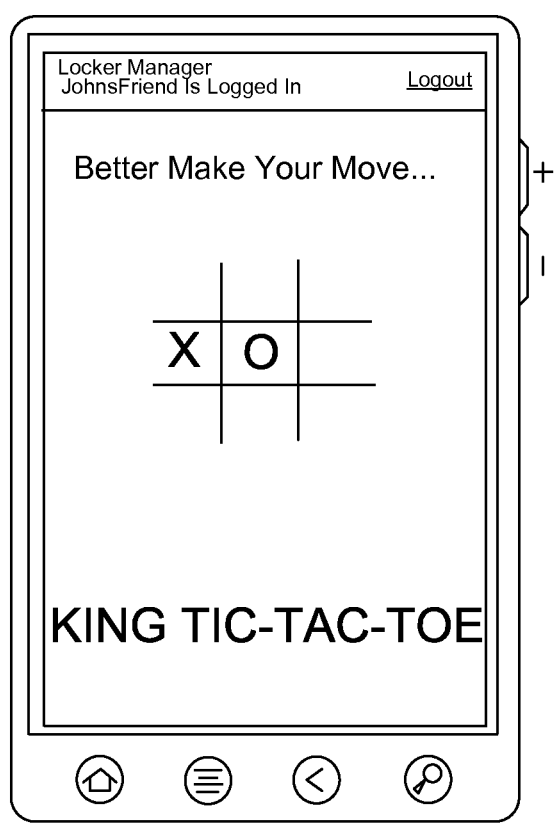

Therefore, let's assume that the Owner passes his phone to his friend ("Friend"), and the Friend logs into the locker manager application 114. Accordingly, the locker manager application 114 receives the Friend's credentials and provides the credentials to the locker manager application 114a at the computing device 103 (FIG. 1). The locker manager application 114a then retrieves the content of the Friend's entitlement locker 116 from the data store 112 (FIG. 1) based on the provided credentials. For illustration, the Friend's entitlement locker 116 may indicate that the Friend previously purchased a particular tic-tac-toe game, "King Tic-Tac-Toe." Accordingly, the locker manager application 114 allows the friend to download and play the same King Tic-Tac-Toe game on the Owner's smartphone, as represented in FIG. 5.

However, the Owner is now restricted from playing the tic-tac-toe game on his phone, since the tic-tac-toe game is not contained in the Owner's entitlement locker 116. Diversely, if the Owner subsequently purchases the tic-tac-toe game, then the Owner will be allowed to play the tic-tac-toe game that may be currently installed on the Owner's smartphone. Alternatively, the Friend may access the tic-tac-toe game from the emulation server application 115 (FIG. 1), where the Owner's smartphone sends inputs over the network 109 (FIG. 1) to the emulation server application 115 running the King Tic-Tac-Toe game application 119. The emulation server application 115 correspondingly sends video and audio output from the King Tic-Tac-Toe application 119 back to the Owner's smartphone (and the locker manager application 114) and rendered on the display 139 (FIG. 1).

In another scenario, the Friend may be entitled to use the email program 414 that resides on the Owner's phone, since the email program 414 is included in the Friend's entitlement locker 116 (FIG. 1). Therefore, while the Friend is logged into the locker manager application 114, the Friend may access the email program 414 that is installed on the Owner's phone. Further, the email program 114 may be uploaded with data identified in the Friend's entitlement locker 116, such as the Friend's email messages (e.g., a type of entitlement data 134) and email folder organizational structure (e.g., a type of saved state data 133), that are being saved in the data store 112. Accordingly, when the Friend logs off of the locker manager application 114, the data from the email program 414 will be transmitted to the data store 112, included in the Friend's entitlement locker 116, and maintained at the data store 112. Correspondingly, the Owner's email data included in the entitlement locker 116 from the data store 112 may be downloaded to the email program 414 the next time the Owner is recognized as accessing the email program 414, regardless if the Owner is accessing the email program 414 from his smartphone or from another computing device.

Now let's assume that the Owner purchases a new car racing game 410 and the game 410 is added to the list of applications in his entitlement locker 116 to which the Owner is entitled. This list may then be retrieved from a locker manager application 114 on whatever client device 106 the Owner is currently using. For example, assume the Owner is using a desktop computer at a library and that the Owner activates a locker manager application 114 on the library computer.

Figure 6:
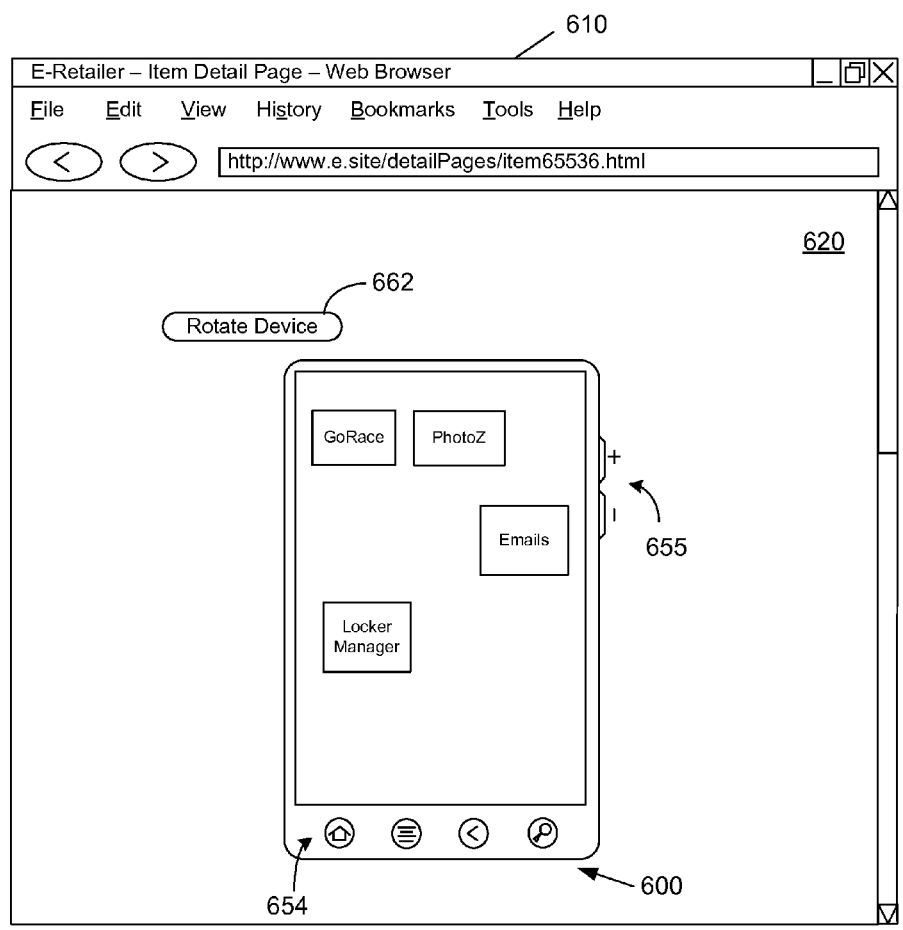
FIG. 6 is a drawing of a user interface of a client device emulated by an emulation server application executed in a computing device in the networked environment of FIG. 1 according to various embodiments of the present disclosure.

In such an embodiment, the Owner may log into the locker manager application 114 and be provided a list of the applications and data to which he is entitled. For example, continuing on to FIG. 6, shown is example of a representative user interface 600 rendered in a client application 145 (FIG. 1) executed in a client 106 (FIG. 1) in the networked environment 100 (FIG. 1). In this example, the client application 145 corresponds to a network browser and the client 106 corresponds to a desktop computer.

The user interface 600 shown in the figure corresponds to a network page generated by the emulation server application 115. Portions of the user interface 600 may be generated by the electronic commerce application 117, while other portions of the user interface 600 may be generated by the emulation server application 115 (FIG. 1). The user interface 600 includes a device interface that is a graphical representation of an emulated computing device, which is in this case a particular model of an Android® smartphone. In some examples, the device interface may correspond to a generic version of the emulated computing device, e.g., a generic version of an Android® smartphone. The device interface is generated by the emulation server application 115 from the applicable device interface 137 (FIG. 1). In addition, a model of a user's client computing device to be emulated and used may be stored in the user's entitlement locker 116.

The user interface 600 includes virtual versions of input buttons 654 and/or other controls that are present in the actual device. Animations and/or images may be used to translate the physical experience into a virtual experience. Audio hardware controls 655 may be provided to control the audio playback from the emulated computing device, e.g., increasing or decreasing the volume of the audio. In other examples, other hardware controls may be provided, e.g., record, fast forward, rewind, stop, previous track, next track, screen brightness, selected display device, etc.

The user interface 600 may include an orientation control 662 to rotate the orientation of the device screen. Activating such an orientation control 662 may cause a virtualized version of an accelerometer or other device to inform the application 119 that the orientation of the emulated computing device has been changed, e.g., from portrait to landscape and vice versa.

The network browser 610 is used to display a representation of the applications and/or data that are part of the user's entitlement locker 116. In this particular example, the user interface 600 is virtually depicted on a network page 620 and is a representation of the Owner's smartphone (as shown in FIG. 4). The desktop layout of icons 410, 412, 414, 416 (FIG. 4) on the Owner's smartphone may be obtained from saved state data 133 and maintained as part of the Owner's entitlement locker 116. Accordingly, on the network page 620, a user or customer is able to use an application 119, 127 in a virtualized environment that resembles the computing device on which it is intended to execute. A similar representation may also be made on a computing device outside the context of using a network browser, as discussed below.

Figure 7:
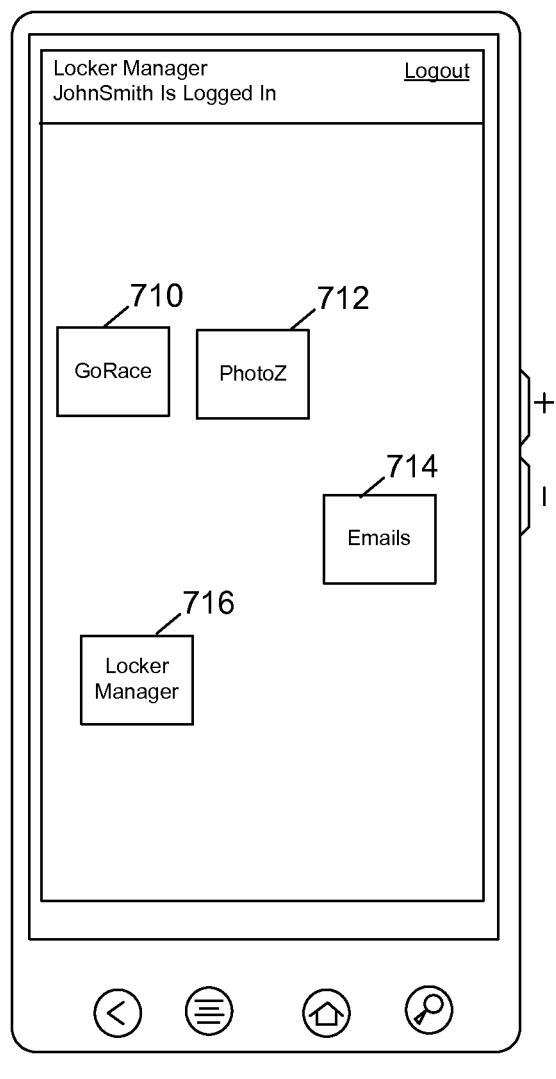

Referring now to FIG. 7 and the previous examples, the Owner identified here as "JohnSmith" is logged into the Friend's smartphone using the locker manager application 114 (FIG. 1) and is provided a representation of a desktop from his own smartphone (as shown in FIG. 4). Accordingly, in this example, JohnSmith may select one of the icons 710, 712, 714, 716 (that mirrors the icons 410, 412, 414, 416 on the desktop of his phone) to request activation of an application that is part of his entitlement locker 116.

Figure 8:
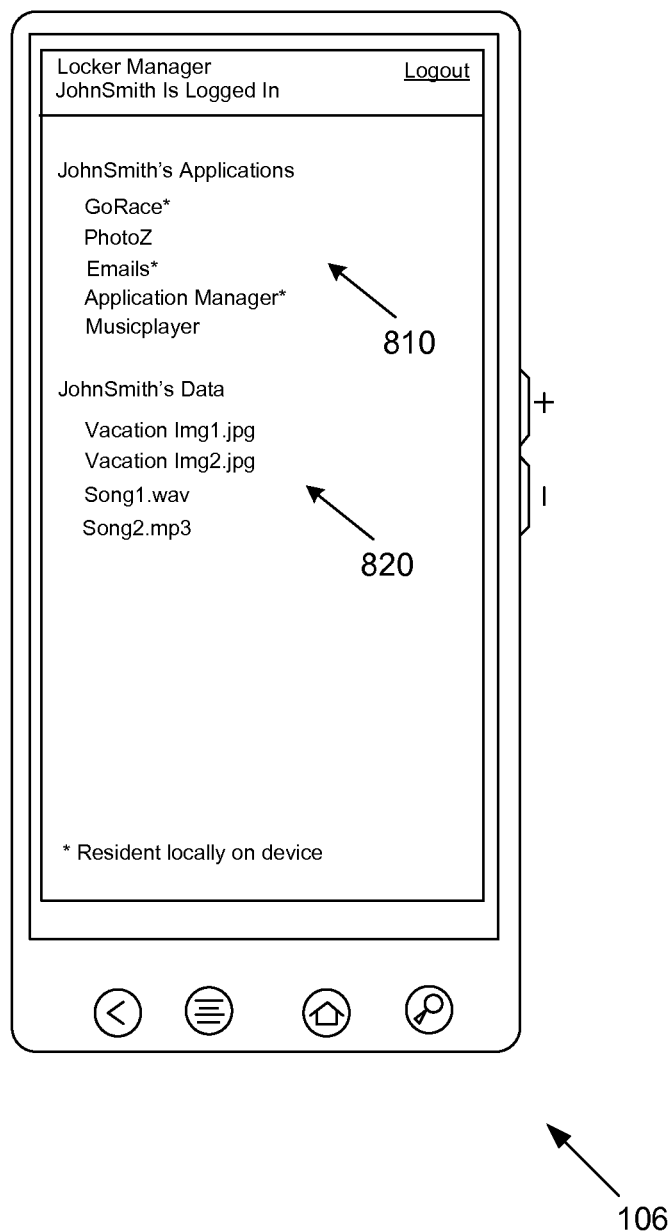

Alternatively to being shown a desktop representation that has been saved within a user's entitlement locker 116, in some embodiments, the locker manager application 114 may simply display a list of applications 810 and entitlement data 820 to which the user is entitled, as shown in FIG. 8. This list may then be retrieved from a locker manager application 114 (FIG. 1) on whatever client device 106 the user ("JohnSmith") is currently using. From this list, it is assumed that the user selects to play the car racing game "GoRace" and that this is the first time that the user has played this particular game.

At the end of playing the game and after logging off from the locker manager application 114, the locker manager application 114 may direct the saved state data 133 (FIG. 1) for the game to be saved at the data store 112 (FIG. 1) for the user and included with the user's entitlement locker 116 (FIG. 1). In one embodiment, a version of the saved state data 133 is saved locally by an application 119 and the locker manager application 114 transfers a copy of the saved state data 133 to the current user's entitlement locker 116. Therefore, although a particular application 119 may only be configured to save state information locally, the save state information 133 may be captured and saved remotely by the locker manager application 114. Accordingly, the saved state information may be copied back to and may replace a locally stored version of the saved state data 133 upon startup of the application 119. Further, in some embodiments, the saved state information for an application 119 is loaded in memory of the local device 106 and the library manager application 114 captures a memory image of the application 119 (or device 106) that is saved remotely with the user's entitlement locker 116. Also, in various embodiments, saved state data 133 may correspond to a particular application state such as passed levels, high scores, saved games, etc. without necessarily making reference to the state of the memory of the local device 106.

Therefore, upon a subsequent startup or reset of the application, the locker manager application 119 may cause the saved state data 133 to be loaded to place the application 119 in the same state in which the user previously saved it. By having a local version or copy and a remote version or copy of the saved state data 133, the local version may be utilized when the remote version is not accessible, such as when the local computing device 106 is offline. Accordingly, when the computing device 106 is online again, the local saved state data 133 may be copied to a remote network storage location, such as data store 112, and thereby be available for use by the same or another computing device 106.

Also, in some embodiments, a particular application 119 may be configured or developed to save state information locally and may make an API (application programming interface) call to a service of the network 109 (e.g., a web service) and pass the information to be saved to the data store 112. The format in which the information is saved is determined by the service and is not pertinent to the application 119. Accordingly, when the application 119 needs to access the information, the application 119 can call the service, make a request, and be provided the requested information.

Accordingly, the user can access applications and data on his or her client computing device 106 (FIG. 1), such as a tablet device or smartphone or someone else's client device 106. Then, the next time the user plays the game on another device, such as a friend's personal smartphone, the saved state data 133 may be retrieved from the data store 112 and loaded to the friend's phone allowing the user to commence playing the game at a previously saved point or state.

Also, of note, in FIG. 8, an asterisk is placed next to applications (and/or data) that is stored locally on the client computing device being currently used. Accordingly, in one embodiment, applications and data contained in a current user's entitlement locker 116 (FIG. 1) may be crosschecked with applications and data maintained on a client device 106 executing the locker manager application. The applications and data found to be stored locally are therefore indicated with an asterisk in the displayed list. This indicates to a current user that a particular application or data is locally residing on the device 106 and will not need to be downloaded or emulated from a remote computing device 103 (FIG. 1) or data store 112 (FIG. 1).

Various embodiments of the locker manager application 114 (FIG. 1) automatically update data utilized by applications 119 (FIG. 1) being accessed by a user to the data store 112 allowing a saved state of a respective application 119 to later be loaded by the application 119. Accordingly, the locker manager application 114 helps to backup up a logged-in user's data to the user's entitlement locker 116 at the data store 112. A saved state data 133 (FIG. 1) for a particular application and a particular user account is maintained and transferred to a client device 106 from which the user is accessing the application, whether emulating the application through a network browser or whether the application is installed to a client device 106. While saved state data for an application is often saved locally, embodiments of the present disclosure further save the file remotely at the data store 112. As discussed, the saved state data 133 may correspond to data saved normally by the application 119 or may correspond to a memory image of the application 119 (or device 106) that may be resumed at any time. Therefore, when the saved state data 133 is transferred to a system/device running a related application, the saved state may be loaded to place the application in the same state in which the user previously saved it.

Various embodiments of the locker manager application 114 collect and transfer state information to the data store 112 in defined intervals or in response to occurrence of defined events. For example, saved state data 133 may be transferred as a background process of a client device 106 during intervals of time, such as every 20 minutes, while a user is logged into the locker manager application 114. Further, saved state data 133 may be transferred when a user logs out or off the locker manager application 114 or when the client device 106 is detected to have powered off or down. Further, in instances where the client computing device 106 is not able to couple to the network 109 (FIG. 1) and to transfer saved state data 133 to the data store 112, transfer events are queued and resumed when the device 106 eventually is able to successfully connect to the network 109. Accordingly, multiple transfer events may be batched and sent to the data store 112. Further, a user may manually request for the transmission of saved state data 133 to the data store 112 or the individual saved state data 133 for individual applications may be automatically sent in accordance with a set schedule. Correspondingly, saved state data 133 may be retrieved from the data store 112 at defined events such as detection of activation of an application 119, powering on of the client device 106, or logging in or on of a user on the locker manager application 114.

In a process of downloading saved state data for an application 119, a current user may be prompted to choose from a plurality of available options or to select whether or not to upload a particular saved state for the application 119. For example, a user may be prompted and asked whether the user would like to start the application 119 from a saved state from a particular date. Also, there may be a scenario where a user can view different saved states and select the particular saved state to which the user wants to return. The user may also be provided an option to delete one of the saved states from the data store 112. Alternatively, if a user chooses to return to a particular saved state, the saved state(s) that were not selected may be automatically deleted. In one embodiment, the deleted save state(s) may have had dates after the selected state's date.

Figure 9:
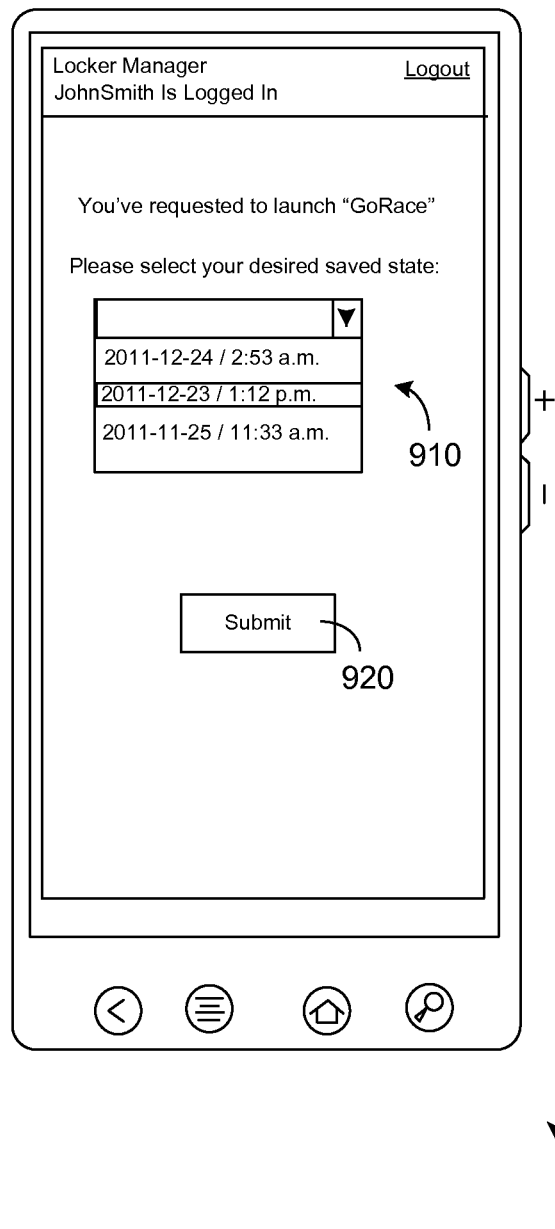

Referring to FIG. 9, one embodiment of an interface 910 for selecting a saved state data file 133 (FIG. 1) is represented. In this example, a user attempts to launch a "GoRace" game and the locker manager application 114 (FIG. 1) before launching the game prompts the user to select a particular saved state, where the possible saved states correspond to a saved state from Dec. 24, 2011 at 2:53 a.m.; a saved state from Dec. 23, 2011 at 1:12 p.m.; and a saved state from Nov. 25, 2011 at 11:33 a.m. Accordingly, these are the dates in which the user previously played the game, and the user may therefore select to start the game from one of these possible points. In an example, the user selects to start the game from the point at which the user left or closed the game on December $23^{rd}$. In some embodiments, after the user makes the selection (of December $23^{rd}$) and selects the submit button 920, the locker manager application 114 directs the saved state from December $24^{th}$ to be deleted.

Figure 10:
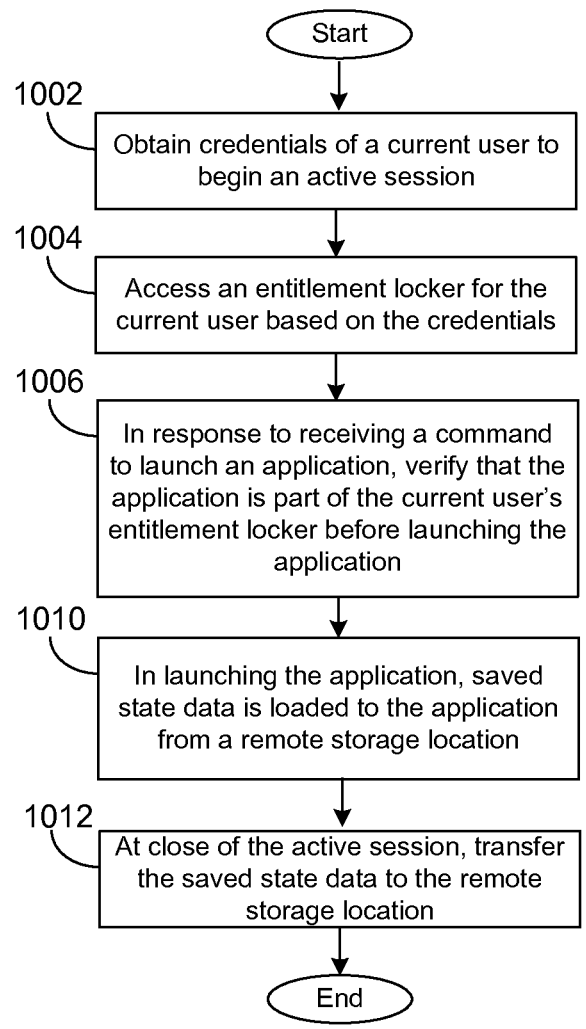
FIGS. 10-14 are flowcharts illustrating examples of functionality implemented as portions of the locker manager application executed in a computing device in the networked environment of FIG. 1 according to various embodiments of the present disclosure.

Referring next to FIG. 10, shown is a flowchart that provides one example of the operation of a portion of the locker manager application 114 (FIG. 1) according to various embodiments. It is understood that the flowchart of FIG. 10 provides merely an example of the many different types of functional arrangements that may be employed to implement the operation of the portion of the locker manager application 114 as described herein. As an alternative, the flowchart of FIG. 10 may be viewed as depicting an example of steps of a method implemented in the computing device 103 (FIG. 1) or computing device 106 (FIG. 1) according to one or more embodiments.

Beginning with box 1002, the locker manager application 114 obtains credentials of a current user of a computing device 106 (FIG. 1) to begin an active session of the locker manager application 114. In box 1004, the locker manager application 114 accesses an entitlement locker 116 (FIG. 1) for the current user based on the received credentials. Then, in box 1006, in response to receiving a command to launch an application 119 (FIG. 1), the locker manager application 114 verifies whether or not the application 119 is part of the current user's entitlement locker 116. When the application is verified, the application is launched and allowed to be accessed by the current user from the computing device 106.

Accordingly, if the application 119 is installed locally on the computing device 106, the current user is allowed to access the local application. However, if the application is not installed locally, then the application 119 may be downloaded to the computing device, installed, and then launched for the current user's benefit. Otherwise, the application may be launched remotely on an emulation server application 115 and application data sent (e.g., via streaming) to the client computing device 106. Diversely, when the application is not verified to be part of the current user's entitlement locker 116, the locker manager application 114 prohibits and does not allow for launching of or emulation of the application 119 for the current user's benefit.

Further, in box 1010, in launching an application 119, saved state data 133 included in the entitlement locker 116 is loaded to the application 119 from a remote storage location (e.g., data store 112). The application data may include application settings, application preferences as indicated by the user, application input and output data files, and saved states. At the close of the active session (e.g., after the user logs off), the saved state data is included in the entitlement locker 116 and transferred to the remote storage location, in box 1012.

Figure 11:
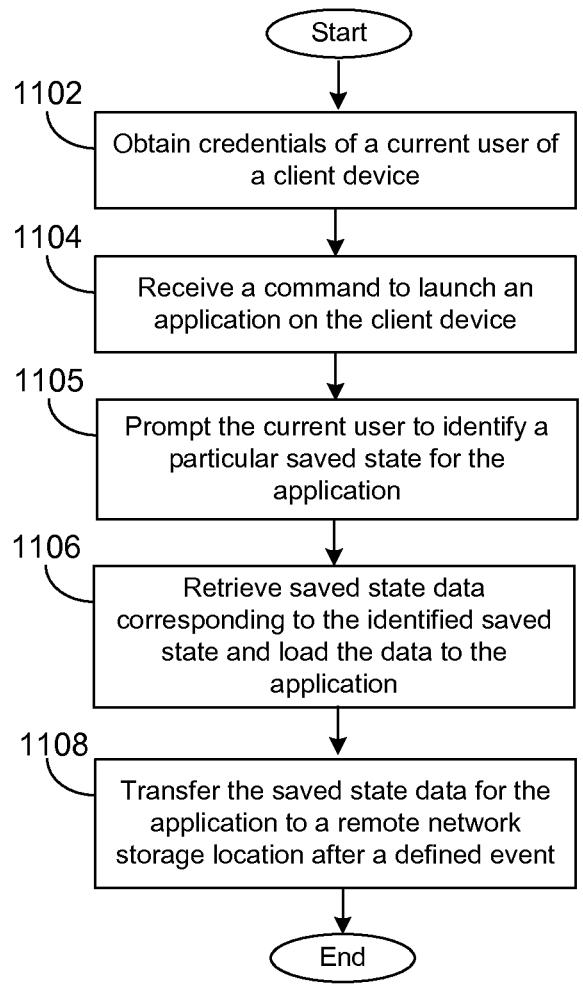

Moving on to FIG. 11, shown is a flowchart that provides one example of the operation of a portion of the locker manager application 114 (FIG. 1) according to various embodiments. It is understood that the flowchart of FIG. 11 provides merely an example of the many different types of functional arrangements that may be employed to implement the operation of the portion of the locker manager application 114 as described herein. As an alternative, the flowchart of FIG. 11 may be viewed as depicting an example of steps of a method implemented in the computing device 103 (FIG. 1) or computing device 106 (FIG. 1) according to one or more embodiments.

Beginning with box 1102, the locker manager application 114 obtains credentials from a current user of a client computing device 106. Further, in box 1104, the locker manager application 114 receives a command to launch an application 119 (FIG. 1) on the client computing device 106. Next, in box 1105, the locker manager application 114 prompts the current user to identify a particular saved state, possibly by identifying a particular date in which saved state data 133 was backed up. Accordingly, in box 1106, the locker manager application 114 retrieves the identified saved state data 133 for the application 119 and loads the saved state data 133 for the application, thereby causing the application 119 to start from a prior state of the application 119 that was previously saved and maintained. Further, in box 1108, after a defined event, such as after expiration of a designated period of time, the state data for the application 119 which is in current use is included in an entitlement locker 116 and transferred to a remote network storage location and associated with the current user and the application. Additionally, upon receiving a command indicating that the current user is logged off the locker manager application 114, the most recent state data for the application 119 is backed up remotely to a network location and associated with the current user and the application.

Figure 12:
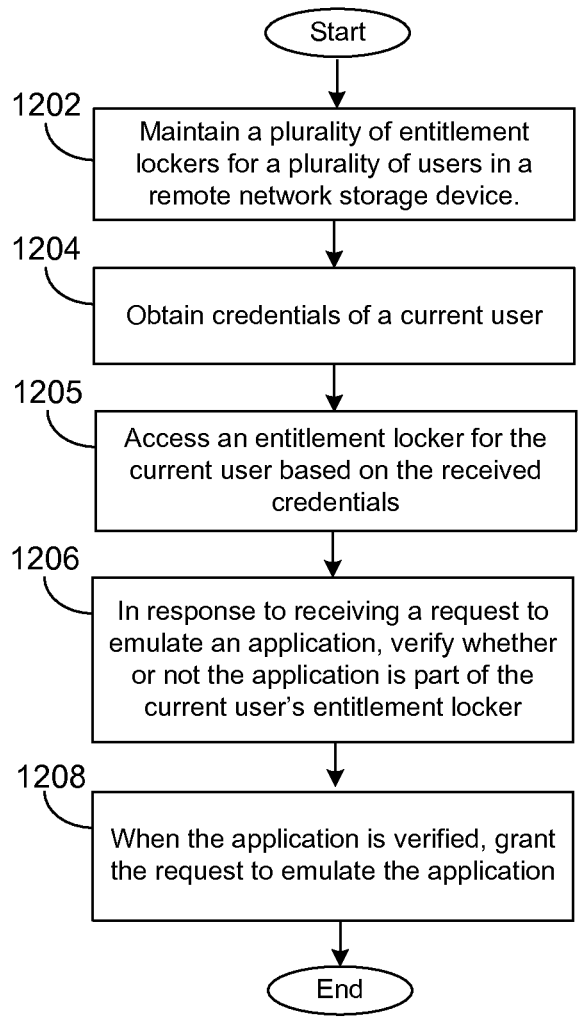

Referring next to FIG. 12, shown is a flowchart that provides one example of the operation of a portion of the locker manager application 114 (FIG. 1) based in a computing device 103 according to various embodiments. It is understood that the flowchart of FIG. 12 provides merely an example of the many different types of functional arrangements that may be employed to implement the operation of the portion of the locker manager application 114 as described herein. As an alternative, the flowchart of FIG. 12 may be viewed as depicting an example of steps of a method implemented in the computing device 103 (FIG. 1) according to one or more embodiments.

Beginning with box 1202, a computing device 103 maintains a plurality of entitlement lockers 116 for a plurality of users in a remote network storage device (e.g., data store 112), where each entitlement locker 116 corresponds to a respective user. Next, in box 1204, the computing device 103 obtains credentials of a current user of a computing device 106 (FIG. 1) to begin an active session of the locker manager application 114. In box 1205, the locker manager application 114 accesses an entitlement locker 116 (FIG. 1) for the current user based on the received credentials. Then, in box 1206, in response to receiving a request to emulate an application 119 (FIG. 1), the computing device 103 verifies whether or not the application 119 is part of the current user's entitlement locker 116. In box 1208, when the application 119 is verified, the request is granted, and the application 119 is emulated by the computing device 103. Accordingly, media data generated by the application 119 is streamed to a computing device 106 of the current user. In some embodiments, as part of the emulation, a virtual model of a computing device is represented as playing or executing the application that matches an actual model of the computing device registered to the current user. Similar to an actual computing device 106, a user may be logged off of the virtual computing device after inactivity on the virtual computing device is detected by the locker manager application 114.

Figure 13:
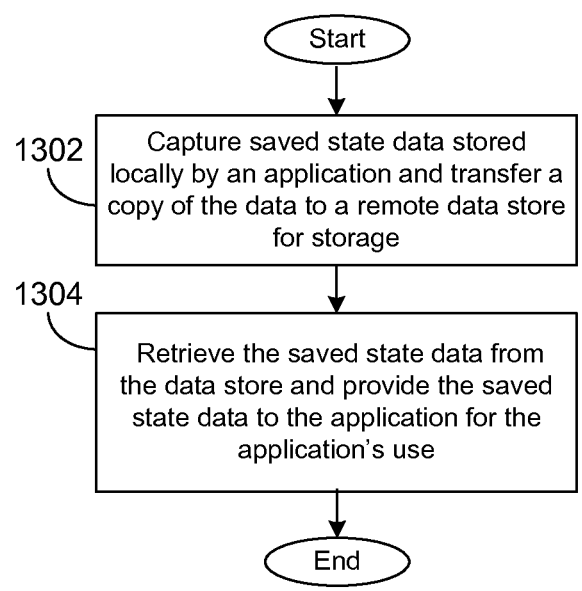

Moving on to FIG. 13, shown is a flowchart that provides one example of the operation of a portion of the locker manager application 114 (FIG. 1) according to various embodiments. It is understood that the flowchart of FIG. 13 provides merely an example of the many different types of functional arrangements that may be employed to implement the operation of the portion of the locker manager application 114 as described herein. As an alternative, the flowchart of FIG. 13 may be viewed as depicting an example of steps of a method implemented in the computing device 103 (FIG. 1) or computing device 106 (FIG. 1) according to one or more embodiments.

Beginning with box 1302, an application 119 installed on a computing device 106 saves saved state data for the application 119 locally on the computing device 106 (e.g., as a saved state data file) and a locker manager application 114 captures the saved state data 133 and transfers a copy of the data 133 (e.g., as a saved state data file) to a remote data store 112 for storage. In particular, state data of the application 119 is copied and stored remotely at occurrence of defined events. In various embodiments, the defined events include events triggered by user action and events set in accordance with a schedule. Events triggered by user action include a request by the user to save the state of a particular application 119; detection of the closing of the application 119 by the user; the user signing off the application 119, locker manager 114, or the local device 106; the user powering off the local device 106, etc. Events set in accordance with a schedule may include a designated interval or period of time in which saved state data for any applications 119 utilized within the interval or period are to be copied and saved remotely. Further, in instances where the local device 106 is not able to connect with the network 109 (FIG. 1) and to transfer saved state data 133 to the remote data store 112, transfer events are queued and resumed when the device 106 eventually is able to successfully connect to the network 109. Accordingly, multiple transfer events may be batched and sent to the data store 112 concurrently.

In one embodiment, the saved state data 133 may be stored as part of an entitlement locker 116 for a user of the computing device 106. Further, developers of the application 119 may not have contemplated that the saved state data 133 would be stored remotely from the application 119 and not directly to the computing device 106 to which the application 119 resides. Also, in some contexts, a developer may design an application that is not intended to save a state of the application. However, embodiments of the locker manager application 114 and related components store a memory image or snapshot of the application 110 at a particular point and later restore the same device or another device to the saved state/point, thereby allowing saved states to be implemented for a particular application 119 that was not designed with save functionality by its respective developer.

Correspondingly, the locker manager application 114 downloads or retrieves the saved state data 133 from the data store 112 (e.g., a saved state data file) and provides the saved state data 133 (e.g., as a saved state data file) to the application 119 for its use, in box 1304. Similar to that described above, the saved state data 133 may be retrieved from its remote location at occurrence of defined events. In various embodiments, the defined events include events triggered by user action, among others. Events triggered by user action include a request by the user to reload the state of a particular application 119; generating a request to open or launch the application 119 by the user; the user signing on the application 119, locker manager 114, or the local device 106; the user powering on the local device 106, etc. Further, in instances where the local device 106 is not able to connect with the network 109 (FIG. 1) and to transfer saved state data 133 to the remote data store 112, retrieval events are queued and resumed when the device 106 eventually is able to successfully connect to the network 109. As a result, multiple retrieval requests may be batched and sent to retrieved saved state data 133 from the data store 112 concurrently.

Accordingly, the locker manager application 114 can load saved state data 133 saved remotely from whatever computing device 106 the user is currently using to access the application 119. In other words, some embodiments allow for a local application 119 to save state data locally on a first computing device, whereby the locker manager application 114 copies the state data to a remote location for storage. Then, on a second computing device, the application may be started, whereby the locker manager application 114 retrieves the saved state data 133 from the remote location and copies the saved state data 133 to the second computing device such that a local application 119 on the second computing device loads the saved state data 133. Therefore, invisible to a local computing device 106, the locker manager application 114 transfers application state data to and retrieves application state data from a remote storage location. The saved state data 133 that is stored remotely can be shared across and is usable for multiple communication devices 106 and their related applications 119, since the saved state data 133 is not limited to only being saved to a single local computing device 106. It is also noted that the remote location to which saved state data 133 may be stored may be considered as part of a network cloud, where the specific location or the specific server within the cloud that is storing the saved state data 133 is invisible to the local computing device 106.

In an additional embodiment, a user may purchase, from an electronic commerce system 117, a computing device 106, such as a tablet device or mobile telephone, and the device may be preloaded and configured with applications 119 and saved state data 133 from the user's entitlement locker 116. Therefore, out of the box and on first use, the user can play or access applications 119 on the device 106 from a previously saved state. As an example, a customer of the electronic commerce application or system 117 may pre-configure a virtual device and request the full loading of that virtual or emulated device to be pushed to a real device prior to shipment of that device from a warehouse to the customer, where saved state data 133 for the virtual device is loaded in the customer's device. Also, in some embodiments, instead of a virtual device, saved state data 133 of an actual peer computing device 106 is copied and transferred to another peer computing device.

Figure 14:
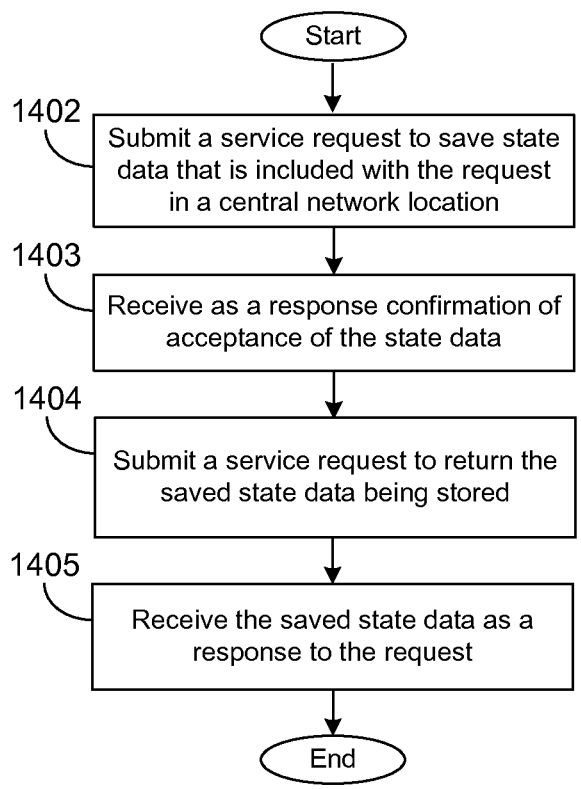

Next, in FIG. 14, a flowchart that provides one example of the operation of a portion of the locker manager application 114 (FIG. 1) according to various embodiments is depicted. It is understood that the flowchart of FIG. 14 provides merely an example of the many different types of functional arrangements that may be employed to implement the operation of the portion of the locker manager application 114 as described herein. As an alternative, the flowchart of FIG. 14 may be viewed as depicting an example of steps of a method implemented in the computing device 103 (FIG. 1) or computing device 106 (FIG. 1) according to one or more embodiments.

First, in box 1402, an application 119, such as a mobile game, submits a service request to a network computing device 103 to save state data (e.g., state data parameters or values) that is included with the request to a central network location or storage medium. The computing device 103 accepts the request and responds with confirmation of the state data being saved, in box 1403.

For example, various embodiments contemplate applications 119 that save state data remotely to a network location by calling a remote application service or API of the computing device 103 in the network 109. The saved state data 133 inputted to the application service may not have a file base representation and it is the application service that determines or specifies the save format for the saved state data 133. For example, the save state data 133 may be saved to a database as opposed to being saved as a file, in some embodiments. Further, in some embodiments, the format of the saved state data may not necessarily be to a disk or hard drive but could be kept in memory. Also, the file format may be generic and differentiated between the applications 119 providing and using the saved state data 133 or differentiated between the underlying platforms executing the applications 119. Rather, in some embodiments, the point of differentiation may be the types of content being stored.

In addition, in one embodiment, multiple versions of an application 119 may exist for different operating platforms, as an example. Further, a respective version of the application 119 may have saved state data 133 that is incompatible with the other version(s) of the application 119. An embodiment of the locker manager application 114 and related components allow for the different versions of the saved state data 133 to be translated between the different versions of the applications 119, thereby allowing for full or partial compatibility or interoperability of applications across either different application versions on the same platform or different application versions between platforms. Accordingly, two incompatible versions of an application 119 might be made fully or partially interoperable without intervention by the developer or change to the applications 119 themselves.

Correspondingly, in box 1404, the application 119 may submit a service request to a remote application on the network computing device 103 (e.g., a data store 112 coupled to the computing device 103) to return the saved state data 133 being stored by the computing device 103. Accordingly, the computing device 103 responds with the saved state data 133 to the application 119, in box 1405. In such a scenario, as an example, a user can play a game on a first computing device for a period of time and then decide to quit and call a network or application service to save the state of the game in a remote network location. Afterwards, the user can decide to play the game on another computing device and call the network or application service to return the saved state data 133 for the game so that the user can proceed from the point in the game from which the user previously ended. Therefore, although the two computing devices being used to play the game may be of different platform technologies, the user may play the game on either device interchangeably.

It is also understood that in addition to a computing device 103 constituting a network server in a cloud environment, in some embodiments, the computing device 103 may include a peer of the computing device 106. Accordingly, a peer device 103 may be connected to or synced with another peer device 106 (e.g., via tethering or a data network), where a saved state of one peer device 106 is copied to the other peer device 103. Therefore, the peer device 103 receiving the copy of the saved state device may emulate or assume the saved state of the other peer device 106. One perceived benefit, with this embodiment, may be that the saved state data 133 is not copied to a third party network allowing for greater privacy.

Figure 15:
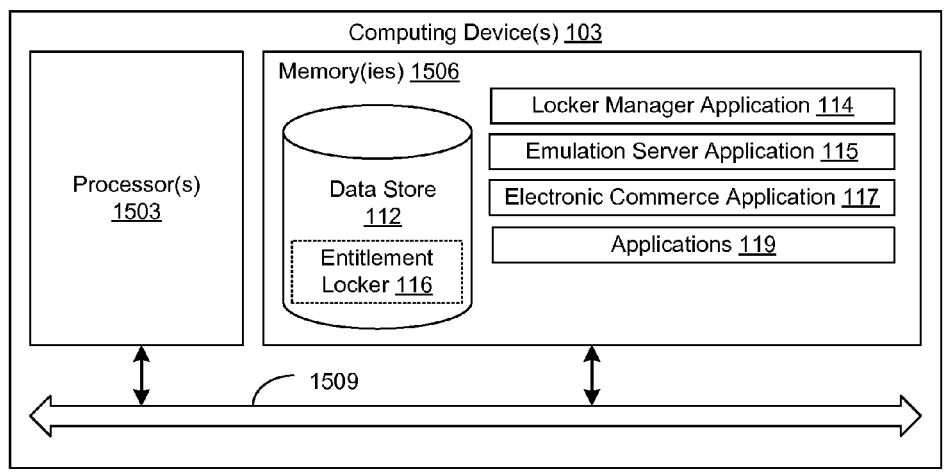
FIG. 15 is a schematic block diagram that provides one example illustration of a computing device employed in the networked environment of FIG. 1 according to various embodiments of the present disclosure.

With reference to FIG. 15, shown is a schematic block diagram of the computing device 103 according to an embodiment of the present disclosure. The computing device 103 includes at least one processor circuit, for example, having a processor 1503, and a memory 1506, all of which are coupled to a local interface 1509. To this end, the computing device 103 may comprise, for example, at least one server computer or like device. The local interface 1509 may comprise, for example, a data bus with an accompanying address/control bus or other bus structure as can be appreciated.

Stored in the memory 1506 are both data and several components that are executable by the processor 1503. In particular, stored in the memory 1506 and executable by the processor 1503 are the locker manager application 114, the emulation server application 115, the electronic commerce application 117, the applications 119, and potentially other applications. Also stored in the memory 1506 may be a data store 112 and other data including entitlement lockers 116 (FIG. 1) and related contents. In addition, an operating system may be stored in the memory 1506 and executable by the processor 1503.

It is understood that there may be other applications that are stored in the memory 1506 and are executable by the processors 1503 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Delphi®, Flash®, or other programming languages.

A number of software components are stored in the memory 1506 and are executable by the processor 1503. In this respect, the term "executable" means a program file that is in a form that can ultimately be run by the processor 1503. Examples of executable programs may be, for example, a compiled program that can be translated into machine code in a format that can be loaded into a random access portion of the memory 1506 and run by the processor 1503, source code that may be expressed in proper format such as object code that is capable of being loaded into a random access portion of the memory 1506 and executed by the processor 1503, or source code that may be interpreted by another executable program to generate instructions in a random access portion of the memory 1506 to be executed by the processor 1503, etc. An executable program may be stored in any portion or component of the memory 1506 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 1506 is defined herein as including both volatile and nonvolatile memory and data storage components. Volatile components are those that do not retain data values upon loss of power. Nonvolatile components are those that retain data upon a loss of power. Thus, the memory 1506 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 1503 may represent multiple processors 1503 and the memory 1506 may represent multiple memories 1506 that operate in parallel processing circuits, respectively. In such a case, the local interface 1509 may be an appropriate network 109 (FIG. 1) that facilitates communication between any two of the multiple processors 1503, between any processor 1503 and any of the memories 1506, or between any two of the memories 1506, etc. The local interface 1509 may comprise additional systems designed to coordinate this communication, including, for example, performing load balancing. The processor 1503 may be of electrical or of some other available construction.

It is understood that a client computing device 106 may be structurally similar to the diagram of FIG. 15. In particular, an embodiment of the client computing device includes at least one processor circuit, for example, having a processor 1503, and a memory 1506, all of which are coupled to a local interface 1509. The local interface 1509 may comprise, for example, a data bus with an accompanying address/control bus or other bus structure as can be appreciated. Stored in the memory 1506 are both data and several components that are executable by the processor 1503. In particular, stored in the memory 1506 and executable by the processor 1503 are the locker manager application 114, and potentially other applications. In addition, an operating system may be stored in the memory 1506 and executable by the processor 1503.

Although the locker manager application 114, emulation server application 115, electronic commerce application 117, the applications 119, the client application 145 (FIG. 1), and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowcharts of FIGS. 10-14 show the functionality and operation of an implementation of portions of the locker manager application 114. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 1503 in a computer system or other system. The machine code may be converted from the source code, etc. If embodied in hardware, each block may represent a circuit or a number of interconnected circuits to implement the specified logical function(s).

Although the flowcharts of FIGS. 10-14 show a specific order of execution, it is understood that the order of execution may differ from that which is depicted. For example, the order of execution of two or more blocks may be scrambled relative to the order shown. Also, two or more blocks shown in succession in FIGS. 10-14 may be executed concurrently or with partial concurrence. Further, in some embodiments, one or more of the blocks shown in FIGS. 10-14 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the locker manager application 114, emulation server application 115, the electronic commerce application 117, the applications 119, and the client application 145, that comprises software or code can be embodied in any non-transitory computer-readable medium for use by or in connection with an instruction execution system such as, for example, a processor 1503 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A method comprising:
    obtaining, by a processor of at least one computing device from a data store, a state data file for a first application with respect to a first media file from an entitlement locker corresponding to a current user, wherein the state data file indicates a bookmark position in the first media file;
    translating, by the processor of at least one computing device, the state data file for the first application to a translated version of the state data file for a second application with respect to a second media file, wherein the second application is configured to present the second media file, the second media file is in a media format that is different from a media format of the first media file, and content of the second media file is related to content of the first media file; and
    providing, by the processor of at least one computing device over a data network, the translated version of the state data file to the second application, wherein the second application is configured to initiate presentation of the second media file at a position indicated by the translated version of the state data file which corresponds to the bookmark position in the first media file.

2. The method of claim 1, wherein the first media file comprises an electronic book file.

3. The method of claim 2, wherein the second media file comprises an audio book file.

4. The method of claim 2, wherein the second media file comprises a movie file.

5. The method of claim 1, further comprising:
    prompting the current user to select a date from a plurality of dates corresponding to instances when a plurality of state data files for the first application with respect to the first media file were previously transferred to the entitlement locker;
    receiving a selection from the current user; and
    designating the state data file corresponding to the selection for translating.

6. A system comprising:
    a computing device; and
    a locker management application executable in the computing device, the locker management application configured to at least:
        obtain, by a processor of the computing device from a data store, a state data file for a first application with respect to first entitlement data from an entitlement locker corresponding to a current user, wherein the first entitlement data comprises a first media file in a first media format and the state data file comprises a bookmark position in the first media file;
        translate, by the processor of the computing device, the state data file for the first application to a translated version of the state data file for a second application with respect to second entitlement data, wherein the second entitlement data comprises a second media file in a second media format that is different from the first media format, and content of the second media file is related to content of the first media file; and provide, by the processor of the computing device over a data network, the translated version of the state data file to the second application, wherein the second application is configured to present the second media file in the second media format and the second application is configured to initiate presentation of the second media file at a position indicated by the translated version of the state data file which corresponds to the bookmark position in the first media file.

7. The system of claim 6, wherein the first application is formatted for a first operating system and the second application is formatted for a second operating system that is different from the first operating system.

8. The system of claim 6, wherein the first media file comprises a video file or an audio file.

9. The system of claim 6, wherein the first media file comprises a software game.

10. The system of claim 6, wherein the first media file comprises an electronic book file configured to operate on a first application platform and the second media file comprises an electronic book file configured to operate on a second application platform that is different from the first application platform.

11. The system of claim 6, wherein the locker management application is further configured to at least:
prompt the current user to select a date from a plurality of dates corresponding to instances when a plurality of state data files for the first application were previously transferred to the entitlement locker;
receive a selection from the current user; and
designate the state data file corresponding to the selection for translating.

12. The system of claim 6, wherein the locker management application is further configured to transmit the second media file from the entitlement locker to the second application.

13. A method comprising:
obtaining, by a processor of at least one computing device from a data store, a state data file for a first application with respect to first entitlement data from an entitlement locker corresponding to a current user, wherein the first entitlement data comprises a first media file in a first media format and the state data file comprises a bookmark position in the first media file;
translating, by the processor of at least one computing device, the state data file for the first application with respect to the first entitlement data to a translated version of the state data file for use with a second application with respect to second entitlement data, wherein the second entitlement data comprises a second media file that is different from the first media file and content of the second media file is related to content of the first media file; and
providing, by the processor of at least one computing device over a data network, the translated version of the translated state data file to the second application, wherein the second application is configured to present the second media file and the second application is configured to initiate presentation of the second media file at a position indicated by the translated version of the state data file that corresponds to the bookmark position in the first media file.

14. The method of claim 13, further comprising:
prompting the current user to select a date from a plurality of dates corresponding to instances when a plurality of state data files for the first entitlement data was previously transferred to the entitlement locker;
receiving a selection from the current user; and
designating the state data file corresponding to the selection for translating.

15. The method of claim 14, further comprising deleting one or more of the plurality of state data files corresponding to one or more dates not selected by the current user.

16. The method of claim 13, wherein the first media file is configured to operate on a first application platform and the second media file is configured to operate on a second application platform that is different from the first application platform.

17. The method of claim 16, wherein the first media file and the second media file comprise software games.

18. The method of claim 13, further comprising periodically receiving an updated copy of the state data file from the first application.

19. The method of claim 13, further comprising receiving identification of the current user of the first application and authorizing the current user to access the entitlement locker corresponding to the current user.

20. The method of claim 13, further comprising:
prompting the current user to select a date from a plurality of dates corresponding to instances when a plurality of state data files for the first entitlement data were previously transferred to the entitlement locker;
receiving a selection from the current user; and
deleting the state data file corresponding to the selection from the entitlement locker.

* * * * *